United States Patent
Yang et al.

(10) Patent No.: US 11,968,699 B2
(45) Date of Patent: Apr. 23, 2024

(54) RADIO COMMUNICATION METHOD AND DEVICE

(71) Applicant: VIVO MOBILE COMMUNICATION CO., LTD., Chang'an Dongguan (CN)

(72) Inventors: Yu Yang, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 414 days.

(21) Appl. No.: 17/244,031

(22) Filed: Apr. 29, 2021

(65) Prior Publication Data
US 2021/0250951 A1 Aug. 12, 2021

Related U.S. Application Data

(63) Continuation of application No. PCT/CN2019/111003, filed on Oct. 14, 2019.

(30) Foreign Application Priority Data

Nov. 2, 2018 (CN) .......................... 201811303170.1

(51) Int. Cl.
*H04W 72/53* (2023.01)
*H04L 5/00* (2006.01)
(Continued)

(52) U.S. Cl.
CPC ............ *H04W 72/53* (2023.01); *H04L 5/0051* (2013.01); *H04W 72/0453* (2013.01); *H04W 72/046* (2013.01); *H04W 72/23* (2023.01)

(58) Field of Classification Search
CPC ........ G01S 13/765; G01S 5/0205; G01S 5/10; G01S 1/20; G01S 11/06; G01S 13/75;
(Continued)

(56) References Cited

U.S. PATENT DOCUMENTS 11,617,195 B2 * 3/2023 Huang ................. H04L 5/0048
370/329
2009/0080569 A1 3/2009 Han
(Continued)

FOREIGN PATENT DOCUMENTS

CN 102299765 A 12/2011
CN 103281277 A 9/2013
(Continued)

OTHER PUBLICATIONS

International Search Report and Written Opinion related to PCT/CN2019/111003 reported on Jan. 6, 2020.
(Continued)

*Primary Examiner* — Nathan S Taylor
(74) *Attorney, Agent, or Firm* — von Briesen & Roper, s.c.

(57) ABSTRACT

A radio communication method and a device are provided. The method includes: in a case in which a first target control resource set (CORESET) is configured for a first cell in a target frequency band, determining first target quasi co-location (QCL) information of the first target CORESET configured for the first cell; and determining, based on the first target QCL information, QCL information of a downlink channel or downlink reference signal in at least one cell or spatial relation information of an uplink channel or uplink reference signal in the at least one cell.

20 Claims, 5 Drawing Sheets

In a case in which a first target control resource set CORESET is configured for a first cell in a target frequency band, determine first target quasi co-location QCL information of the first target CORESET configured for the first cell — S110

Determine, based on the first target QCL information, QCL information of a downlink channel or downlink reference signal in at least one cell or spatial relation information of an uplink channel or uplink reference signal in the at least one cell — S120

(51) Int. Cl.
H04W 72/044 (2023.01)
H04W 72/0453 (2023.01)
H04W 72/23 (2023.01)

(58) Field of Classification Search
CPC .. G01S 13/76; G01S 5/02; G01S 5/06; H04W 56/009; H04W 64/003; H04W 64/006; H04W 56/00; H04W 64/00; H04W 24/02; H04W 24/10; H04W 4/02; H04W 4/33; H04W 88/00; H04W 52/0206; H04W 52/0212; H04W 52/0225; H04W 52/0251; H04W 52/0229; H04W 84/12; H04W 88/06; H04W 52/02; H04W 56/0045; H04W 28/0252; H04W 28/0268; H04W 28/0875; H04W 72/1263; H04W 72/569; H04W 92/18; H04W 80/02; H04W 72/12; H04W 72/0453; H04W 72/046; H04W 72/23; H04W 72/53; H04W 72/04; H04L 43/106; H04L 5/00; H04L 5/0053; H04L 5/0094; H04L 5/001; H04L 5/0023; H04L 5/0048; H04L 5/0051; H04B 17/27; H04B 7/24–7/26

See application file for complete search history.

(56) References Cited

U.S. PATENT DOCUMENTS

| | | | |
|---|---|---|---|
| 2018/0324005 A1 | 11/2018 | Kim | |
| 2019/0297640 A1* | 9/2019 | Liou | H04L 5/001 |
| 2019/0349964 A1* | 11/2019 | Liou | H04W 76/27 |
| 2019/0357185 A1* | 11/2019 | Kwak | H04L 1/0071 |
| 2020/0021414 A1 | 1/2020 | Ding | |
| 2020/0045569 A1* | 2/2020 | Seo | H04L 5/0048 |
| 2020/0059335 A1 | 2/2020 | Hu | |
| 2020/0076670 A1 | 3/2020 | Liu | |
| 2020/0145081 A1* | 5/2020 | Zhou | H04B 7/0617 |
| 2020/0145982 A1* | 5/2020 | Cheng | H04W 72/044 |
| 2020/0367272 A1* | 11/2020 | Ge | H04W 72/20 |
| 2020/0404690 A1* | 12/2020 | Lee | H04L 5/001 |
| 2021/0028883 A1* | 1/2021 | Wang | H04L 5/0053 |
| 2021/0050936 A1* | 2/2021 | Seo | H04L 5/0053 |
| 2021/0058931 A1* | 2/2021 | Da | H04L 5/0053 |
| 2021/0314927 A1* | 10/2021 | Noh | H04L 5/0053 |
| 2021/0377825 A1* | 12/2021 | Deenoo | H04W 48/12 |
| 2022/0007258 A1* | 1/2022 | Liou | H04B 7/0408 |

FOREIGN PATENT DOCUMENTS

| | | | | |
|---|---|---|---|---|
| CN | 108809609 A | 11/2018 | | |
| CN | 109219134 A | 1/2019 | | |
| CN | 109245844 A | 1/2019 | | |
| CN | 109246042 A | 1/2019 | | |
| EP | 3337111 A1 | 6/2018 | | |
| EP | 4027701 A1 * | 7/2022 | | B28B 7/346 |
| WO | 2018190678 A1 | 10/2018 | | |
| WO | WO-2019192304 A1 * | 10/2019 | | H04L 1/0038 |

OTHER PUBLICATIONS

Ericsson; Feature lead summary for beam management—Thursday; 3GPP TSG-RAN WG1 Meeting #94, Gothenburg, Aug. 20-24, 2018, Tdoc R1-1809864.

Vivo; Remaining issues on beam measurement and reporting; 3GPP TSG RAN WG1 Meeting #94, Gothenburg, Sweden, Aug. 20-24, 2018, R1-1808221.

Korean first Office Action related to Application No. 10-20217014665 reported on Mar. 20, 2023.

R1-1808196, Source: ZTE, "Maintenance for beam management", Document for: Discussion and Decision, Agenda Item 7.1.2.3, Release: 3GPP TSG RAN WG1 Meeting #94, Aug. 20-24, 2018, Gothenburg, Sweden.

R1-1811188, Source: Ericsson, "Enhancements on Multi-Beam Operation", Document for; Discussion, Agenda Item 7.2.8.3, Release: 3GPP TSG RAN WG1 Meeting #94bis. Oct. 8-12, 2018, Chengdu, China.

R1-1811231, Source: Qualcomm Incorporated, "Beam management for NR", Document for: Discussion/Decision, Agenda Item 7.1.2.3, Release: 3GPP TSG-RAN WG1 Meeting #94bis, Oct. 8-12, 2018, Chengdu, China.

Japanese Reasons For Refusal Office Action related to Application No. 2021-523512 reported on Jun. 21, 2022.

R1-1810214, Source: ZTE, "Maintenance for beam management", Document for: Discussion and Decision, Agenda Item 7.1.2.3, Release: 3GPP TSG RAN WG1 Meeting #94bis, Oct. 8-12, 2018, Chengdu, China.

R1-1810751, Source: Intel Corporation,"Remaining issues on Beam Management", Document for: Discussion and Decision, Agenda Item 7.1.2.3, Release: 3GPP TSG RAN WG1 Meeting #94b, Oct. 8-12, 2018, Chengdu, China.

R1-1812324, Source: Vivo," Discussion on Enhancements on Multi-Beam Operation", Document for: Discussion and Decision, Agenda Item 7.2.8.3, Release: 3GPP TSG RAN WG1 Meeting #95. Nov. 12-16, 2018, Spokance, USA.

R1-1715967; 3GPP TSG RAN WG1 Meeting NR#3; Remaining detains on DMRS, Discussion and Decision, Nagoya, Japan, Sep. 18-21, 2017.

R1-1813892; 3GPP TSG RAN WG1 Meeting #95, Discussion and Decision, Spokane, USA, Nov. 12-16, 2018.

Office Action from Chinese Patent Office dated Oct. 28, 2020, in related application 201910117787.2.

Written Opinion and International Preliminary Report on Patentability dated Aug. 26, 2021, in related application PCT/CN2020/075028 filed Feb. 13, 2020.

Extended European Search Report related to Application No. 19880115.1 reported on Nov. 18, 2021.

R1-1809425—Source: Qualcomm Incorporated "Details on simultaneous reception/transmission of PHY channels and RS in FR2", Agenda item: 7.1.2.5, Document for: Discussion/Decision, 3GPP TSG RAN WG1 Meeting #94, Gothenburg, Sweden, Aug. 20-24, 2018.

* cited by examiner

Transmit a spatial transmission information set, where the spatial transmission information set includes a quasi co-location QCL information set or a spatial relation information set, and the spatial transmission information set is used by a terminal device to determine QCL information of a downlink channel or downlink reference signal in at least one cell and spatial relation information of an uplink channel or uplink reference signal in the at least one cell ~ S710

FIG. 7

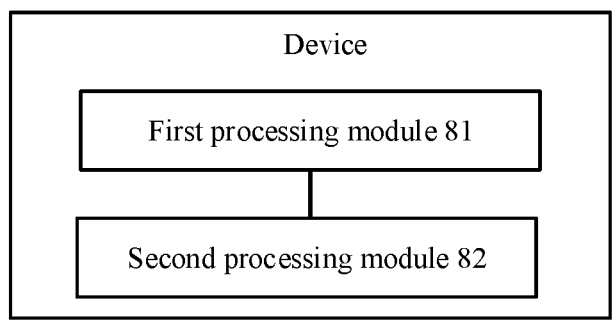

FIG. 8

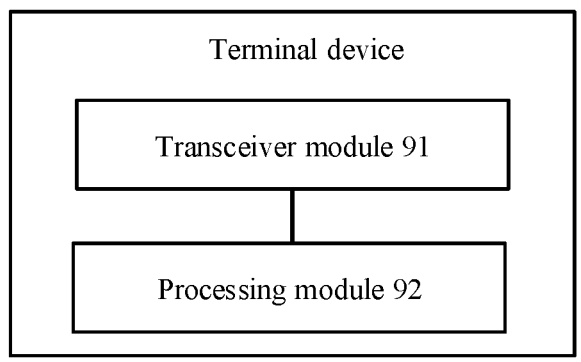

FIG. 9

RADIO COMMUNICATION METHOD AND DEVICE

CROSS-REFERENCE TO RELATED APPLICATIONS

This application is a continuation application of a PCT Application No. PCT/CN2019/111003 filed on Oct. 14, 2019, which claims priority to Chinese Patent Application No. 201811303170.1, filed in China on Nov. 2, 2018, the disclosures of which are incorporated herein by reference in their entireties.

TECHNICAL FIELD

This application relates to the field of communications technologies, and more specifically, to a radio communication method and a device.

BACKGROUND

In a mobile communications system, with regard to beam indication for a physical downlink control channel (PDCCH), a network device configures K transmission configuration indication (TCI) states for each control resource set (CORESET) by using radio resource control (RRC) signaling. When K>1, one TCI state is indicated by a media access control control element (MAC CE); when K=1, no additional MAC CE command is required. When monitoring a CORESET, a terminal device uses same quasi co-location (QCL) information, namely a same TCI state, for all search spaces within the CORESET. The terminal device can learn a receive beam of the PDCCH based on the TCI state.

With regard to beam indication for a physical downlink share channel (PDSCH), the network device configures M TCI states by using RRC signaling, activates $2^N$ TCI states by using a MAC CE command, and then uses an N-bit field in downlink control information (DCI) to notify the TCI states. The terminal device can learn a receive beam of the PDSCH based on the notified TCI states.

With regard to beam indication for a physical uplink control channel (PUCCH), the network device configures spatial relation information for each PUCCH resource by using RRC signaling. When spatial relation information configured for a PUCCH resource includes a plurality of entries, spatial relation information of one of the entries is indicated by using a MAC CE.

With regard to beam indication for a physical uplink share channel (PUSCH), the network device configures related information of the PUSCH by using RRC signaling. When DCI carried on the PDCCH schedules the PUSCH, each code point of a sounding reference signal resource indicator (SRI) field in the DCI indicates one SRI, and the SRI is used to indicate a spatial relation of the PUSCH.

With regard to beam indication for an SRS, when the SRS is a periodic SRS, the network device configures a spatial relation for an SRS resource by using RRC signaling. When the SRS is a semi-persistent SRS, the network device activates, by using a MAC CE command, one of a set of spatial relations configured by using RRC signaling. When an SR type is aperiodic SRS, the network device configures a spatial relation for an SRS resource by using RRC signaling.

It can be learned from the foregoing description that currently with regard to the beam indication for uplink and downlink channels or reference signals, candidate QCL information or spatial relation information is usually configured by using RRC signaling and then is activated by using a MAC CE command or indicated by using DCI. When the candidate QCL information or the spatial relation information is to be reconfigured, the RRC signaling needs to be used again for configuration, resulting in relatively large higher-layer signaling overheads.

SUMMARY

Embodiments of this disclosure are to provide a radio communication method and a device, so as to reduce higher-layer signaling overheads.

According to a first aspect, a radio communication method is provided, where the method includes: in a case in which a first target CORESET is configured for a first cell in a target frequency band, determining first target QCL information of the first target CORESET configured for the first cell; and determining, based on the first target QCL information, QCL information of a downlink channel or downlink reference signal in at least one cell or spatial relation information of an uplink channel or uplink reference signal in the at least one cell.

According to a second aspect, a radio communication method is provided, where the method includes: receiving a spatial transmission information set, where the spatial transmission information set includes a QCL information set and a spatial relation information set; determining QCL information of a downlink channel or downlink reference signal in at least one cell based on the QCL information set; and determining spatial relation information of an uplink channel or uplink reference signal in the at least one cell based on the spatial relation information set.

According to a third aspect, a radio communication method is provided, where the method includes: receiving a spatial transmission information set, where the spatial transmission information set includes a QCL information set or a spatial relation information set; and determining, based on the spatial transmission information set, QCL information of a downlink channel or downlink reference signal in at least one cell and spatial relation information of an uplink channel or uplink reference signal in the at least one cell.

According to a fourth aspect, a radio communication method is provided, where the method includes: transmitting a spatial transmission information set, where the spatial transmission information set includes a QCL information set and a spatial relation information set, the QCL information set is used by a terminal device to determine QCL information of a downlink channel or downlink reference signal in at least one cell, and the spatial relation information set is used by the terminal device to determine spatial relation information of an uplink channel or uplink reference signal in the at least one cell.

According to a fifth aspect, a radio communication method is provided, where the method includes: transmitting a spatial transmission information set, where the spatial transmission information set includes a QCL information set or a spatial relation information set, and the spatial transmission information set is used by a terminal device to determine QCL information of a downlink channel or downlink reference signal in at least one cell and spatial relation information of an uplink channel or uplink reference signal in the at least one cell.

According to a sixth aspect, a device is provided, where the device includes: a first processing module, configured to: in a case in which a first target CORESET is configured for a first cell in a target frequency band, determine first target QCL information of the first target CORESET configured for the first cell; and a second processing module, configured to: determine, based on the first target QCL information, QCL information of a downlink channel or downlink reference signal in at least one cell or spatial relation information of an uplink channel or uplink reference signal in the at least one cell.

According to a seventh aspect, a terminal device is provided, where the terminal device includes: a transceiver module, configured to receive a spatial transmission information set, where the spatial transmission information set includes a QCL information set and a spatial relation information set; and a processing module, configured to determine QCL information of a downlink channel or downlink reference signal in at least one cell based on the QCL information set; where the processing module is further configured to determine spatial relation information of an uplink channel or uplink reference signal in the at least one cell based on the spatial relation information set.

According to an eighth aspect, a terminal device is provided, where the terminal device includes: a transceiver module, configured to receive a spatial transmission information set, where the spatial transmission information set includes a QCL information set or a spatial relation information set; and a processing module, configured to determine, based on the spatial transmission information set, QCL information of a downlink channel or downlink reference signal in at least one cell and spatial relation information of an uplink channel or uplink reference signal in the at least one cell.

According to a ninth aspect, a network device is provided, where the network device includes: a transceiver module, configured to transmit a spatial transmission information set, where the spatial transmission information set includes a QCL information set and a spatial relation information set, the QCL information set is used by a terminal device to determine QCL information of a downlink channel or downlink reference signal in at least one cell, and the spatial relation information set is used by the terminal device to determine spatial relation information of an uplink channel or uplink reference signal in the at least one cell.

According to a tenth aspect, a network device is provided, where the network device includes: a transceiver module, configured to transmit a spatial transmission information set, where the spatial transmission information set includes a QCL information set or a spatial relation information set, and the spatial transmission information set is used by a terminal device to determine QCL information of a downlink channel or downlink reference signal in at least one cell and spatial relation information of an uplink channel or uplink reference signal in the at least one cell.

According to an eleventh aspect, a device is provided, where the device includes a memory, a processor, and a computer program stored in the memory and capable of running on the processor, and when the computer program is executed by the processor, the steps of the radio communication method according to the first aspect are implemented.

According to a twelfth aspect, a terminal device is provided, where the terminal device includes a memory, a processor, and a computer program stored in the memory and capable of running on the processor, and when the computer program is executed by the processor, the steps of the radio communication method according to the second aspect are implemented.

According to a thirteenth aspect, a terminal device is provided, where the terminal device includes a memory, a processor, and a computer program stored in the memory and capable of running on the processor, and when the computer program is executed by the processor, the steps of the radio communication method according to the third aspect are implemented.

According to a fourteenth aspect, a network device is provided, where the network device includes a memory, a processor, and a computer program stored in the memory and capable of running on the processor, and when the computer program is executed by the processor, the steps of the radio communication method according to the fourth aspect are implemented.

According to a fifteenth aspect, a network device is provided, where the network device includes a memory, a processor, and a computer program stored in the memory and capable of running on the processor, and when the computer program is executed by the processor, the steps of the radio communication method according to the fifth aspect are implemented.

According to a sixteenth aspect, a computer-readable storage medium is provided, where a computer program is stored in the computer-readable storage medium, and when the computer program is executed by a processor, the steps of the radio communication method according to the first aspect to the fifth aspect are implemented.

In some embodiments of this disclosure, the terminal device may determine, based on QCL information of a specific CORESET in the target frequency band, the QCL information of the downlink channel or downlink reference signal and the spatial relation information of the uplink channel or uplink reference signal information in the at least one cell, not requiring configuration by the network device by using higher-layer information, thereby reducing higher-layer signaling overheads.

BRIEF DESCRIPTION OF DRAWINGS

The accompanying drawings described herein are intended for better understanding of this disclosure, and constitute a part of this disclosure. Exemplary embodiments and descriptions thereof in this disclosure are intended to interpret this disclosure and do not constitute any improper limitation on this disclosure. In the accompanying drawings:

FIG. 7 is still another schematic flowchart of a radio communication method according to an embodiment of this disclosure;

FIG. 8 is a schematic structural diagram of a device according to an embodiment of this disclosure;

FIG. 9 is a schematic structural diagram of a terminal device according to an embodiment of this disclosure;

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

The technical solutions of this disclosure can be applied to various communications systems, such as a long term evolution (LTE)/long term evolution-advanced (LTE-A) system and a new radio (NR) system.

In some embodiments of this disclosure, the terminal device (User Equipment, UE) is also referred to as a mobile terminal, mobile user equipment, and the like, and may communicate with one or more core networks through a radio access network (for example, Radio Access Network, RAN). The user equipment may be a mobile terminal, such as a mobile phone (or referred to as a "cellular" phone) or a computer with a mobile terminal. For example, the user equipment may be a portable, pocket-sized, handheld, computer built-in, or in-vehicle mobile apparatus, which exchanges voice and/or data with the radio access network.

In some embodiments of this disclosure, a network device is an apparatus deployed in a radio access network device to provide radio communication functions for terminal devices. For example, the network device may be a base station, and the base station may be an evolved base station (eNB or e-NodeB, evolutional Node B) in LTE and a 5G base station (gNB).

The technical solutions provided in the embodiments of this disclosure are described in detail below with reference to the accompanying drawings.

It should be noted that downlink channels in some embodiments of this disclosure include but are not limited to PDCCH and PDSCH. Downlink reference signals include but are not limited to cell-specific reference signals (CRS), demodulation reference signals (DMRS), and channel state information reference signals (CSI-RS). Uplink channels include but are not limited to PUCCH and PUSCH, and uplink reference signals include but are not limited to SRS.

Figure 1:
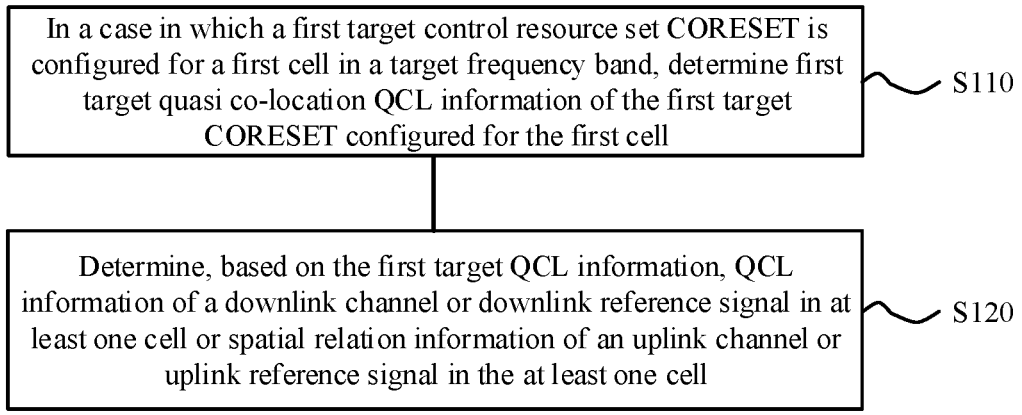
FIG. 1 is a schematic flowchart of a radio communication method according to an embodiment of this disclosure.

FIG. 1 shows a radio communication method according to an embodiment of this application. The method shown in FIG. 1 may be executed by a communication device, and the communication device may be a terminal device or a network device. As shown in FIG. 1, the method includes:

S110: In a case in which a first target CORESET is configured for a first cell in a target frequency band, determine first target QCL information of the first target CORESET configured for the first cell.

In S110, an ID of the first target CORESET may be a specific value. For example, the ID of the first target CORESET is 0, that is, the first target CORESET is CORESET #0.

S120: Determine, based on the first target QCL information, QCL information of a downlink channel or downlink reference signal in at least one cell or spatial relation information of an uplink channel or uplink reference signal in the at least one cell.

The at least one cell in S120 may include the first cell, or may not include the first cell. The at least one cell may be in the same frequency band or not in the same frequency band, for example, some cells of the at least one cell are in one frequency band, and other cells of the at least one cell are in another frequency band.

The first target QCL information in S120 may be determined by the terminal device, based on indication by a MAC CE, from a first QCL information set to which the first target QCL information belongs, and the first QCL information set is configured by a network device by using RRC signaling. For example, the network device uses a higher-layer parameter pdsch-Config in the RRC signaling to carry information for configuring the first QCL information set.

Using the first target CORESET being CORESET #0 as an example, the network device configures related information of CORESET #0 for the first cell. The related information includes a QCL information set configured for CORESET #0 (which may also be understood that the network device configures a QCL pool or a TCI state pool for CORESET #0). When a candidate QCL information set includes a plurality of pieces of QCL information, the network device activates (or indicates) one piece of QCL information for CORESET #0 by using a MAC CE, and the activated (or indicated) QCL information is the first target QCL information. When the QCL information set needs to be reconfigured, the network device may perform reconfiguration by using RRC signaling, and reactivate (or indicate) QCL information for CORESET #0 by using a MAC CE.

Optionally, in some embodiments, in S120, the determining QCL information of a downlink channel or downlink reference signal in at least one cell includes: determining QCL information of a downlink channel or downlink reference signal on part or all of bandwidth parts (BWPs) of each of the at least one cell. The determining spatial relation information of an uplink channel or uplink reference signal in the at least one cell includes: determining spatial relation information of an uplink channel or uplink reference signal on part or all of BWPs of each of the at least one cell.

The following describes the technical solutions of this disclosure with reference to specific examples.

Example A

The at least one cell includes the first cell. In S120, the determining, based on the first target QCL information, QCL information of a downlink channel or downlink reference signal in the at least one cell includes: determining that QCL information of a downlink channel or downlink reference signal in the first cell is the first target QCL information. For example, the QCL information of CORESET #0 in the first cell is used as QCL information of a PDCCH in the first cell.

Alternatively, the at least one cell includes the first cell. In S120, the determining, based on the first target QCL information, QCL information of a downlink channel or downlink reference signal in the at least one cell includes:

determining that a QCL information set of a downlink channel or downlink reference signal in the first cell is a first QCL information set to which the first target QCL information belongs; and determining QCL information of the downlink channel or downlink reference signal in the first cell from the QCL information set of the downlink channel or downlink reference signal in the first cell. Herein, the determining QCL information of the downlink channel or downlink reference signal in the first cell from the QCL information set of the downlink channel or downlink reference signal in the first cell may be performed based on the indication by the MAC CE.

Further alternatively, the at least one cell includes the first cell and a plurality of CORESETs are configured for the first cell. In a case in which the plurality of CORESETs include the first target CORESET, in S120, the determining, based on the first target QCL information, QCL information of a downlink channel or downlink reference signal in the at least one cell includes: based on indication by a MAC CE, determining, from a first QCL information set to which the first target QCL information belongs, QCL information of a CORESET other than the first target CORESET in the plurality of CORESETs.

For example, for a CORESET whose ID is not 0 and that is configured for the first cell, the network device activates (or indicates) one as QCL information of the CORESET from the QCL information set of CORESET #0 by using the MAC CE, that is, QCL information of uplink and downlink channels or uplink and downlink reference signals in the CORESET.

Example B

The at least one cell includes the first cell and a second cell, and the first target CORESET is not configured for the second cell. Correspondingly, in S120, the determining, based on the first target QCL information, QCL information of a downlink channel or downlink reference signal in the at least one cell includes: determining QCL information of a downlink channel or downlink reference signal in the second cell based on the first target QCL information.

Optionally, the determining QCL information of a downlink channel or downlink reference signal in the second cell based on the first target QCL information includes: determining that the QCL information of the downlink channel or downlink reference signal in the second cell is the first target QCL information. Alternatively, it can be understood that the first target QCL information of the first target CORESET configured for the first cell is used as the QCL information of the downlink channel or downlink reference signal in the second cell.

Alternatively, the determining QCL information of a downlink channel or downlink reference signal in the second cell based on the first target QCL information includes: determining the QCL information of the downlink channel or downlink reference signal in the second cell based on the first QCL information set to which the first target QCL information belongs.

For example, a QCL information set of the downlink channel or downlink reference signal in the second cell is determined to be the first QCL information set to which the first target QCL information belongs; and the QCL information of the downlink channel or downlink reference signal in the second cell is determined from the QCL information set of the downlink channel or downlink reference signal in the second cell. Herein, the QCL information of the downlink channel or downlink reference signal in the second cell may be determined from the first QCL information set according to a preset rule. Alternatively, the terminal device may determine the QCL information of the downlink channel or downlink reference signal in the second cell from the first QCL information set based on indication by the network device.

Optionally, in Example b, a cell index of the first cell satisfies a first preset rule. For example, the first cell is a cell with the smallest cell index in the cells configured with the first target CORESET within the frequency band.

Optionally, in Example b, the second cell is located in the target frequency band, that is, the first cell and the second cell are located in the same frequency band.

Example C

Figure 2:
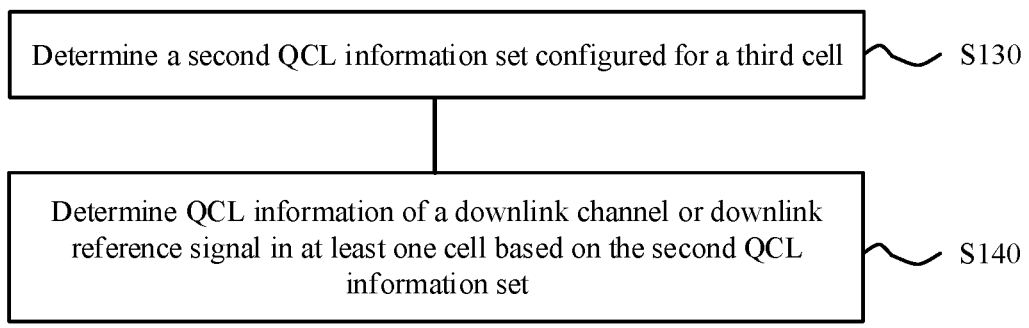
FIG. 2 is another schematic flowchart of a radio communication method according to an embodiment of this disclosure.

The first target CORESET is configured for none of cells in a frequency band in which each of the at least one cell is located. As shown in FIG. 2, the method shown in FIG. 1 further includes the following steps.

S130: Determine a second QCL information set configured for a third cell.

The network device may configure the second QCL information set for the third cell by using RRC signaling.

It should be noted that the third cell may be a cell in a frequency band in which a specific cell of the at least one cell is located, or a frequency band in which the third cell is located is different from a frequency band in which any one of the at least one cell is located.

Herein, the third cell may be a cell whose cell index satisfies a given rule and that is in the frequency band in which the third cell is located. For example, the third cell may be a cell with the smallest cell index in the frequency band in which the third cell is located.

For example, the at least one cell is located in the target frequency band, and the third cell is located in the target frequency band. To be specific, when the first target CORESET is configured for none of cells in one frequency band, QCL information of a downlink channel or downlink reference signal in a cell in the frequency band may be determined based on a QCL information set configured for a cell in the frequency band.

S140: Determine the QCL information of the downlink channel or downlink reference signal in the at least one cell based on the second QCL information set.

For example, the determining the QCL information of the downlink channel or downlink reference signal in the at least one cell based on the second QCL information set includes: determining, from the second QCL information set, second target QCL information of a second target CORESET configured for the third cell; and determining that the QCL information of the downlink channel or downlink reference signal in the at least one cell is the second target QCL information. The network device may use a MAC CE to activate (or indicate) one piece of QCL information in the second QCL information set as the second target QCL information of the second target CORESET.

Alternatively, the determining the QCL information of the downlink channel or downlink reference signal in the at least one cell based on the second QCL information set includes: determining that a QCL information set of the downlink channel or downlink reference signal in the at least one cell is the second QCL information set; and determining the QCL information of the downlink channel or downlink reference signal in the at least one cell from the QCL information set of the downlink channel or downlink reference signal in the at least one cell.

In Example c, a cell index of the third cell satisfies a second preset rule; and/or an ID of the second target CORESET satisfies a third preset rule; and/or an ID of a bandwidth part (BWP) on which the second target CORESET is located satisfies a fourth preset rule.

For example, the third cell is a cell with a specific cell index (for example, the smallest cell index) in the frequency band. The second target CORESET may be a CORESET with a specific ID, for example, may be a CORESET with the smallest ID. The BWP on which the second target CORESET is located may be a BWP with a specific ID, for example, may be a BWP with the smallest ID in the third cell. The "ID" herein may also be expressed as "identifier or index".

Using the first target CORESET being CORESET #0 as an example, when CORESET #0 is configured for none of cells in a frequency band, the network device may configure QCL information for a specific CORESET of a specific cell in the frequency band, and CORESETs of all the cells in the frequency band use the QCL information.

Example D

The at least one cell includes the first cell, and in S120, the determining, based on the first target QCL information, spatial relation information of an uplink channel or uplink reference signal in the at least one cell includes: determining a reference signal RS set corresponding to a first transmission configuration indication TCI state, where the first TCI state is used for indicating the first target QCL information; and determining spatial relation information of an uplink channel or uplink reference signal in the first cell based on a source RS in the RS set.

For example, a source (Source) RS (or referred to as Reference RS) in an RS set corresponding to a TCI state that indicates the first target QCL information of CORESET #0 is used as a source RS in spatial relation information of a PUCCH. Assuming that the terminal device determines a receive beam for CORESET #0 reception based on the TCI state indicating the first target QCL information of CORESET #0, the terminal device uses a transmit beam in the direction of the receive beam (except for the opposite direction, other spatial parameters of the beam are the same) to transmit the PUCCH.

Example E

The at least one cell includes the first cell, and in S120, the determining, based on the first target QCL information, spatial relation information of an uplink channel or uplink reference signal in the at least one cell includes: determining spatial relation information of an uplink channel or uplink reference signal in the first cell based on a first QCL information set to which the first target QCL information belongs.

Optionally, the determining the spatial relation information of the uplink channel or uplink reference signal in the first cell based on a first QCL information set to which the first target QCL information belongs includes: determining a second TCI state used for indicating all QCL information in the first QCL information set; determining candidate spatial relation information of the uplink channel or uplink reference signal in the first cell based on all source RSs in an RS set corresponding to the second TCI state; and determining the spatial relation information of the uplink channel or uplink reference signal in the first cell from the candidate spatial relation information.

For example, all source RSs in the RS set corresponding to the TCI state that indicates the QCL information set of CORESET #0 are used as a source RS in candidate spatial relation information of the PUCCH, and a subset is then selected from the source RS in the candidate spatial relation information of the PUCCH and is used as an RS in spatial relation information of the PUCCH. Alternatively, it can be described as: the candidate spatial relation information of the PUCCH is determined based on all source RSs in the RS set corresponding to the TCI state that indicates the QCL information set of CORESET #0, and then a subset is selected from the candidate spatial relation information as spatial relation information of the PUCCH.

Further, the determining the spatial relation information of the uplink channel or uplink reference signal in the first cell from the candidate spatial relation information includes: based on indication by radio resource control RRC signaling and/or a MAC CE, determining the spatial relation information of the uplink channel or uplink reference signal in the first cell from the candidate spatial relation information. For example, there are 64 source RSs in the candidate spatial relation information, and the network device uses RRC signaling or a MAC CE to indicate eight source RSs as source RSs in the spatial relation information of the PUCCH.

Optionally, a maximum quantity of pieces of configurable spatial relation information in a cell is greater than or equal to a quantity of pieces of QCL information in the first QCL information set; and the determining the spatial relation information of the uplink channel or uplink reference signal in the first cell based on a first QCL information set to which the first target QCL information belongs includes: determining a second TCI state used for indicating all QCL information in the first QCL information set; determining candidate spatial relation information of the uplink channel or uplink reference signal in the first cell based on all source RSs in an RS set corresponding to the second TCI state; and determining the spatial relation information of the uplink channel or uplink reference signal in the first cell from the candidate spatial relation information.

For example, if the maximum quantity of pieces of spatial relation information that allows the network device to configure for the PUCCH is greater than or equal to a quantity of pieces of QCL information in a QCL information set of CORESET #0, the QCL information in the QCL information set of CORESET #0 may be directly used as the spatial relation information of the PUCCH.

Optionally, the determining spatial relation information of an uplink channel or uplink reference signal in the first cell based on a first QCL information set to which the first target QCL information belongs includes: determining a preset quantity of pieces of QCL information from the first QCL information set; and determining the spatial relation of the uplink channel or uplink reference signal in the first cell based on a source RS in an RS set corresponding to a third TCI state, where the third TCI state is used for indicating the preset quantity of pieces of QCL information. Herein, determining the preset quantity of pieces of QCL information from the first QCL information set may be performed according to a protocol. For the terminal device, determining the preset quantity of pieces of QCL information from the first QCL information set may alternatively be performed based on indication by the network device.

For example, if a fixed quantity of pieces of QCL information (for example, eight pieces of QCL information whose TCI state has the smallest entry during configuration) are selected from the QCL information set of CORESET #0, source RSs in an RS set corresponding to the TCI state for the fixed quantity of pieces of QCL information are used as source RSs of the spatial relation information of the PUCCH, so as to determine the spatial relation information of the PUCCH.

Example F

The at least one cell includes the first cell and a fourth cell, and the first target CORESET is not configured for the fourth cell. In S120, the determining, based on the first target QCL information, spatial relation information of an uplink channel or uplink reference signal in the at least one cell further includes: determining spatial relation information of an uplink channel or uplink reference signal in the fourth cell based on the first target QCL information.

In other words, the spatial relation information of the uplink channel or uplink reference signal in the fourth cell may be determined based on the first target QCL information of the first target CORESET configured for the first cell.

Optionally, the determining spatial relation information of an uplink channel or uplink reference signal in the fourth cell based on the first target QCL information includes: determining the first TCI state used for indicating the first target QCL information; and determining the spatial relation information of the uplink channel or uplink reference signal in the fourth cell based on a source RS in the RS set corresponding to the first TCI state.

For example, the source RS in the RS set corresponding to the TCI state that indicates the first target QCL information of CORESET #0 configured for the first cell is used as a source RS in spatial relation information of a PUCCH in the fourth cell. Assuming that the terminal device determines a receive beam for CORESET #0 reception based on the TCI state indicating the first target QCL information of CORESET #0, the terminal device uses a transmit beam in the direction of the receive beam (except for the opposite direction, other spatial parameters of the beam are the same) in the fourth cell to transmit the PUCCH.

Optionally, the determining spatial relation information of an uplink channel or uplink reference signal in the fourth cell based on the first target QCL information includes: determining the spatial relation information of the uplink channel or uplink reference signal in the fourth cell based on the first QCL information set to which the first target QCL information belongs.

For example, a second TCI state used for indicating all information in the first QCL information set is determined; candidate spatial relation information of the uplink channel or uplink reference signal in the fourth cell is determined based on all source RSs in an RS set corresponding to the second TCI state; and the spatial relation information of the uplink channel or uplink reference signal in the fourth cell is determined from the candidate spatial relation information.

Alternatively, a preset quantity of pieces of QCL information is determined from the first QCL information set; and the spatial relation information of the uplink channel or uplink reference signal in the fourth cell is determined based on a source RS in an RS set corresponding to a TCI state that indicates the preset quantity of pieces of QCL information.

Optionally, in Example f, the fourth cell is located in the target frequency band, that is, the first cell and the fourth cell are located in the same frequency band.

Example G

Figure 3:
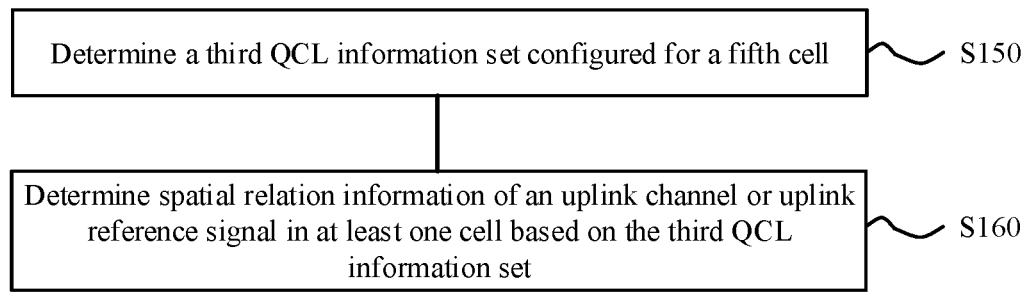
FIG. 3 is still another schematic flowchart of a radio communication method according to an embodiment of this disclosure.

In a case in which the first target CORESET is configured for none of cells in a frequency band in which each of the at least one cell is located, as shown in FIG. 3, the method shown in FIG. 1 further includes the following steps.

S150: Determine a third QCL information set configured for a fifth cell.

It should be noted that the fifth cell may be a cell in a frequency band in which a specific cell of the at least one cell is located, or a frequency band in which the fifth cell is located is different from a frequency band in which any one of the at least one cell is located. Herein, the fifth cell may be a cell whose cell index satisfies a given rule and that is in the frequency band in which the fifth cell is located. For example, the fifth cell may be a cell with the smallest cell index in the frequency band in which the fifth cell is located.

S160: Determine the spatial relation information of the uplink channel or uplink reference signal in the at least one cell based on the third QCL information set.

Optionally, the at least one cell is located in the target frequency band, and the fifth cell is located in the target frequency band. To be specific, when the first target CORESET is configured for none of cells in one frequency band, spatial relation information of an uplink channel or uplink reference signal in a cell in the frequency band can be determined based on a QCL information set configured for a cell in the frequency band.

Optionally, the determining the spatial relation information of the uplink channel or uplink reference signal in the at least one cell based on the third QCL information set includes: determining a TCI state used for indicating all QCL information in the third QCL information set; determining candidate spatial relation information of the uplink channel or uplink reference signal in the at least one cell based on all source RSs in an RS set corresponding to the TCI state that is used for indicating all the QCL information in the third QCL information set; and determining the spatial relation information of the uplink channel or uplink reference signal in the at least one cell from the spatial relation information.

Optionally, the determining the spatial relation information of the uplink channel or uplink reference signal in the at least one cell based on the third QCL information set includes: determining a preset quantity of pieces of QCL information from the third QCL information set; and determining the spatial relation of the uplink channel or uplink reference signal in the at least one cell based on a source RS in an RS set corresponding to a TCI state that is used for indicating the preset quantity of pieces of QCL information.

Optionally, the determining the spatial relation information of the uplink channel or uplink reference signal in the at least one cell based on the third QCL information set includes: determining, from the third QCL information set, third target QCL information of a third target CORESET configured for the fifth cell; and determining the spatial relation information of the uplink channel or uplink reference signal in the at least one cell based on the third target QCL information. The network device may use a MAC CE to activate (or indicate) one piece of QCL information of the third QCL information set as the third target QCL information for the third target CORESET.

Herein, the determining the spatial relation information of the uplink channel or uplink reference signal in the at least one cell based on the third target QCL information includes: determining a TCI state used for indicating the third target QCL information; and determining the spatial relation information of the uplink channel or uplink reference signal in the at least one cell based on a source RS in the RS set corresponding to the TCI state that is used for indicating the third target QCL information.

In Example g, a cell index of the fifth cell satisfies a fifth preset rule; and/or an ID of the third target CORESET satisfies a sixth preset rule; and/or an ID of a BWP on which the third target CORESET is located satisfies a seventh preset rule.

For example, the fifth cell is a cell with a specific cell index (for example, the smallest cell index) in the frequency band. The third target CORESET may be a CORESET with a specific ID, for example, may be a CORESET with the smallest ID. The BWP on which the third target CORESET is located may be a BWP with a specific ID, for example, may be a BWP with the smallest ID in the fifth cell.

Example H

The at least one cell includes the first cell and a sixth cell, and a QCL information set is not configured for the sixth cell. The method shown in FIG. 1 further includes: determining that a QCL information set of the sixth cell is a first QCL information set to which the first target QCL information belongs; and determining, based on the QCL information set of the sixth cell, QCL information of a downlink channel or downlink reference signal in the sixth cell and spatial relation information of an uplink channel or uplink reference signal in the sixth cell.

It can be understood that in Example h, after the first QCL information set of the first cell is used as the QCL information set of the sixth cell, an implementation method for determining the QCL information of the downlink channel or downlink reference signal in the sixth cell based on the QCL information set of the sixth cell is the same as an implementation method for determining the QCL information of the downlink channel or downlink reference signal in the first cell based on the first QCL information set to which the first QCL information of the first target CORESET configured for the first cell belongs in the foregoing example. To avoid repetition, details are not described herein again.

Similarly, for determining the spatial relation information of the uplink channel or uplink reference signal in the sixth cell based on the QCL information set of the sixth cell, refer to an implementation method for determining the spatial relation information of the uplink channel or uplink reference signal in the first cell based on the first QCL information set to which the first QCL information of the first target CORESET configured for the first cell belongs in the foregoing example. Details are not described herein again.

The first cell in Example h may be a cell with the smallest cell index in cells configured with QCL information sets.

Optionally, the sixth cell is located in the target frequency band, that is, the first cell and the sixth cell are located in the same frequency band.

Example I

The at least one cell includes the first cell and a seventh cell, and a QCL information set is not configured for the seventh cell. The method shown in FIG. 1 further includes: determining that QCL information of a downlink channel or downlink reference signal in the seventh cell is the QCL information of the downlink channel or downlink reference signal in the first cell; and/or determining spatial relation information of an uplink channel or uplink reference signal in the seventh cell based on the QCL information of the downlink channel or downlink reference signal in the first cell.

For example, QCL information of a PDCCH of the first cell is determined as the QCL information of the downlink channel or downlink reference signal in the seventh cell. Alternatively, the spatial relation information of the uplink channel (for example, PUCCH) or the uplink reference signal (for example, SRS) in the seventh cell is determined based on the QCL information of the PDCCH in the first cell.

Optionally, the determining spatial relation information of an uplink channel or uplink reference signal in the seventh cell based on the QCL information of the downlink channel or downlink reference signal in the first cell includes: determining the spatial relation information of the uplink channel or uplink reference signal in the seventh cell based on a source RS in an RS set corresponding to a TCI state that is used for indicating the QCL information of the downlink channel or downlink reference signal in the first cell.

Alternatively, the determining spatial relation information of an uplink channel or uplink reference signal in the seventh cell based on the QCL information of the downlink channel or downlink reference signal in the first cell includes: determining candidate spatial relation information of the uplink channel or uplink reference signal in the seventh cell based on all source RSs in an RS set corresponding to the TCI state that is used for indicating all the QCL information in the QCL information set to which the QCL information of the downlink channel or downlink reference signal in the first cell belongs; and determining the spatial relation information of the uplink channel or uplink reference signal in the seventh cell from the candidate spatial relation information.

Alternatively, the determining spatial relation information of an uplink channel or uplink reference signal in the seventh cell based on the QCL information of the downlink channel or downlink reference signal in the first cell includes: selecting a preset quantity of pieces of QCL information from a QCL information set to which the QCL information of the downlink channel or downlink reference signal in the first cell belongs; and determining the spatial relation information of the uplink channel or uplink reference signal in the seventh cell based on a source RS in an RS set corresponding to a TCI state that is used for indicating the preset quantity of pieces of QCL information.

Optionally, the seventh cell is located in the target frequency band, that is, the first cell and the seventh cell are located in the same frequency band.

Example J

The at least one cell includes the first cell and an eighth cell, and a QCL information set is not configured for the eighth cell. The method shown in FIG. 1 further includes: determining that spatial relation information of an uplink channel or uplink reference signal in the eighth cell is the spatial relation information of the uplink channel or uplink reference signal in the first cell.

For example, spatial relation information of a PUCCH of the first cell is determined as the spatial relation information of the uplink channel or uplink reference signal in the eighth cell.

Optionally, the first cell in Examples i and j may be a cell with the smallest cell index in cells configured with QCL information sets.

Optionally, the eighth cell is located in the target frequency band, that is, the first cell and the eighth cell are located in the same frequency band.

Based on Examples b, c, f, g, h, i, and j, the terminal device may determine QCL information of a downlink channel or downlink reference signal in another cell and spatial relation information of an uplink channel or uplink reference signal in the another cell based on QCL information (or a QCL information set) of a specific CORESET configured for a specific cell, not requiring the network device to perform configuration for each cell by using higher-layer signaling, thereby reducing higher-layer signaling overheads.

Figure 4:
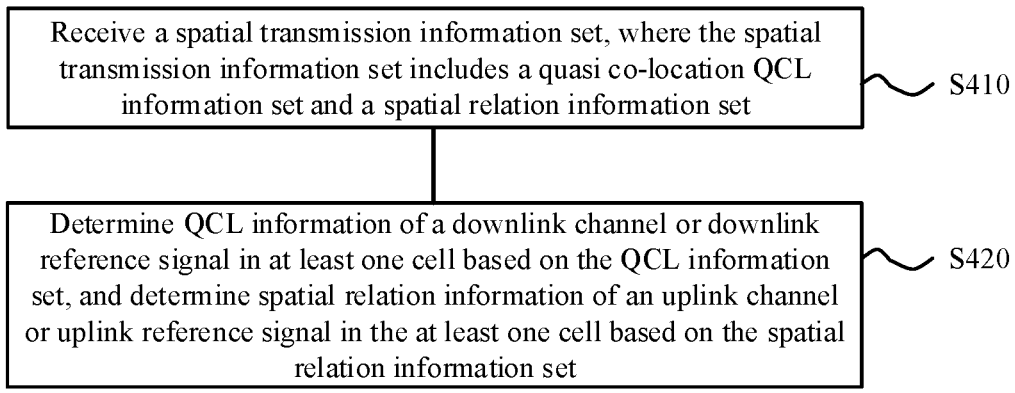
FIG. 4 is another schematic flowchart of a radio communication method according to an embodiment of this disclosure.

FIG. 4 is a radio communication method according to an embodiment of this disclosure. The method shown in FIG. 4 may be executed by a terminal device. As shown in FIG. 4, the method includes the following steps.

S410: Receive a spatial transmission information set, where the spatial transmission information set includes a QCL information set and a spatial relation information set.

S420: Determine QCL information of a downlink channel or downlink reference signal in at least one cell based on the QCL information set; and determine spatial relation information of an uplink channel or uplink reference signal in the at least one cell based on the spatial relation information set.

It should be noted that the spatial transmission information set received in S410 that includes the QCL information set and the spatial relation information set can be understood as: the network device configures the QCL information set for downlink in a cell of the terminal device and configures the spatial relation information set for uplink in the cell of the terminal device.

Optionally, as an example, the QCL information set is a common QCL information set for all cells in the at least one cell, and the spatial relation information set is a common spatial relation information set for all the cells in the at least one cell; or the QCL information set is configured by a network device for a first target cell in the at least one cell, and the spatial relation information set is configured by the network device for a second target cell in the at least one cell.

Optionally, a cell index of the first target cell satisfies a first preset rule; and/or a cell index of the second target cell satisfies a second preset rule. For example, the first target cell is a cell with the smallest cell index in the at least one cell, and the second target cell is a cell with the largest cell index in the at least one cell.

In other words, the network device may configure a same QCL information set for cells of the terminal device, and QCL information in each cell may be selected from the QCL information set, or the network device may configure a QCL information set for a specific cell in the cells of the terminal device. The QCL information in each cell may be selected from the QCL information set configured for the specific cell. Alternatively, the network device may configure a same spatial relation information set for the cells of the terminal device, and spatial relation information in each cell may be selected from the spatial relation information set, or the network device may configure a spatial relation information set for a specific cell in the cells of the terminal device. The spatial relation information in each cell may be selected from the spatial relation information set configured for the specific cell. Therefore, the network device does not need to separately configure QCL information and spatial relation information for each channel or reference signal on each BWP of each cell, thereby reducing higher-layer signaling overheads.

For example, if information used by the network device to configure the QCL information set and the spatial relation information set does not include a cell index, it is considered that the QCL information set and the spatial relation information set are the common QCL information set and the common spatial relation information set for all the cells in the at least one cell. If the information used by the network device to configure the QCL information set and the spatial relation information set includes a cell index, it is considered that the QCL information set and the spatial relation information set are configured for a cell corresponding to the cell index.

Optionally, in some embodiments, in a case in which the at least one cell includes a plurality of cells, the plurality of cells are located in a same frequency band.

Optionally, in some embodiments, in S420, the determining QCL information of a downlink channel or downlink reference signal in at least one cell includes: determining QCL information of a downlink channel or downlink reference signal on part or all of BWPs of each of the at least one cell. In S420, the determining spatial relation information of an uplink channel or uplink reference signal in the at least one cell includes: determining spatial relation information of an uplink channel or uplink reference signal on part or all of BWPs of each of the at least one cell.

Figure 5:
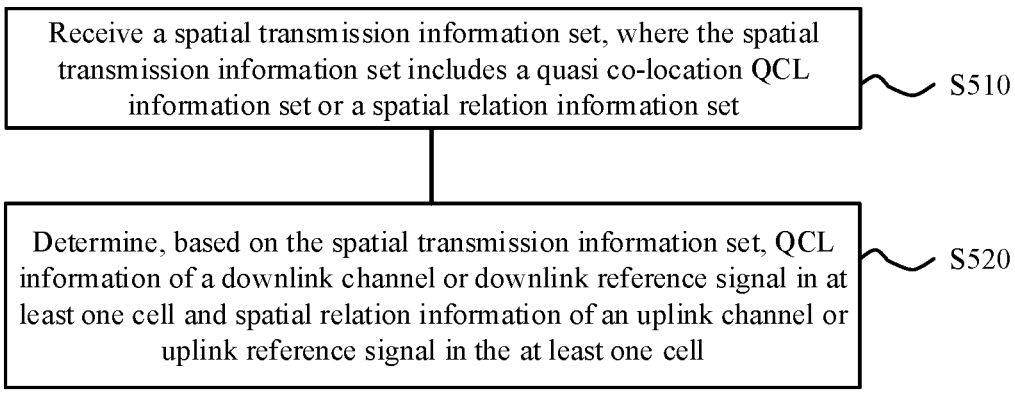
FIG. 5 is still another schematic flowchart of a radio communication method according to an embodiment of this disclosure.

FIG. 5 is a radio communication method according to an embodiment of this disclosure. The method shown in FIG. 5 may be executed by a terminal device. As shown in FIG. 5, the method includes the following steps.

S510: Receive a spatial transmission information set, where the spatial transmission information set includes a QCL information set or a spatial relation information set.

S520: Determine, based on the spatial transmission information set, QCL information of a downlink channel or downlink reference signal in at least one cell and spatial relation information of an uplink channel or uplink reference signal in the at least one cell.

It should be noted that the spatial transmission information set received in S510 that includes the QCL information set or the spatial relation information set can be understood as: the network device configures the same spatial transmission information set for downlink and uplink in a cell of the terminal device. Therefore, the network device does not need to separately configure a spatial transmission information set for the downlink and uplink of the terminal device, reducing higher-layer signaling overheads.

Optionally, as an example, the spatial transmission information set is a common spatial transmission information set of all cells in the at least one cell, or the spatial transmission information set is configured by the network device for a target cell in the at least one cell.

Optionally, a cell index of a target cell satisfies a preset rule. For example, the target cell is a cell with the smallest cell index in the at least one cell.

Optionally, in some embodiments, in S520, the determining QCL information of a downlink channel or downlink reference signal in at least one cell includes: determining QCL information of a downlink channel or downlink reference signal on part or all of BWPs of each of the at least one cell. In S520, the determining spatial relation information of an uplink channel or uplink reference signal in the at least one cell includes: determining spatial relation information of an uplink channel or uplink reference signal on part or all of BWPs of each of the at least one cell.

Optionally, in some embodiments, in a case in which the at least one cell includes a plurality of cells, the plurality of cells are located in a same frequency band.

It can be understood that if the spatial transmission information set includes the QCL information set in S510, determining the QCL information of the downlink channel or downlink reference signal in the at least one cell based on the spatial transmission information set in S520 may be selecting the QCL information for the at least one cell from the QCL information set. A specific selection method is not limited in this embodiment of this disclosure.

Alternatively, if the spatial transmission information set includes the QCL information set in S510, an implementation manner of determining the spatial relation information of the uplink channel or uplink reference signal in the at least one cell based on the spatial transmission information set in S520 may be: determining candidate spatial relation information of the uplink channel or uplink reference signal in the at least one cell based on all source RSs in an RS set corresponding to a TCI state that is used for indicating all QCL information in the QCL information set; and determining the spatial relation information of the uplink channel or uplink reference signal in the at least one cell from the candidate spatial relation information. Alternatively, a preset quantity of pieces of QCL information is determined from the QCL information set; and the spatial relation information of the uplink channel or uplink reference signal in the at least one cell is determined based on a source RS in an RS set corresponding to a TCI state that is used for indicating the preset quantity of pieces of QCL information.

It can be further understood that if the spatial transmission information set includes the spatial relation information set in S510, the determining the spatial relation information of the uplink channel or uplink reference signal in the at least one cell based on the spatial transmission information set in S520 may be: selecting the spatial relation information for the at least one cell from the spatial relation information set. A specific selection method is not limited in this embodiment of this disclosure.

Alternatively, if the spatial transmission information set includes the spatial relation information set in S510, an implementation manner of determining the QCL information of the downlink channel or downlink reference signal in the at least one cell based on the spatial transmission information set in S520 may be: determining candidate QCL information of the downlink channel or downlink reference signal in the at least one cell based on all source RSs in all spatial relation information in the spatial relation information set, and determining the QCL information of the downlink channel or downlink reference signal in the at least one cell from the candidate QCL information; or determining a preset quantity of pieces of spatial relation information from the spatial relation information set, and determining the QCL information of the downlink channel or downlink reference signal in the at least one cell based on a source RS in the preset quantity of pieces of spatial relation information.

Figure 6:
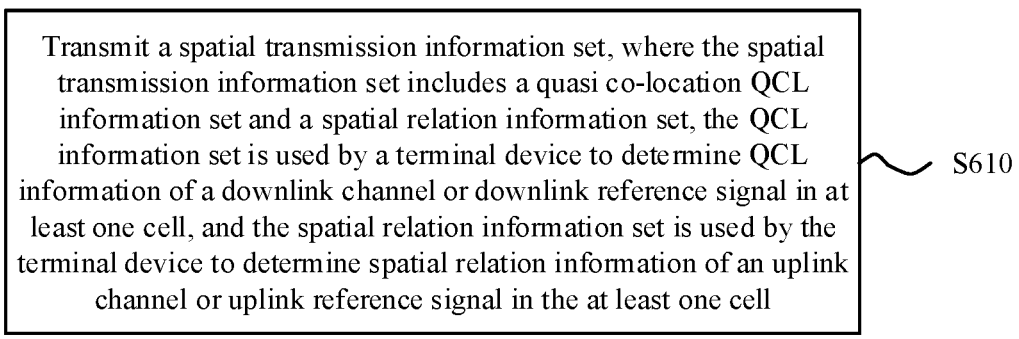
FIG. 6 is another schematic flowchart of a radio communication method according to an embodiment of this disclosure.

FIG. 6 is a radio communication method according to an embodiment of this disclosure. The method shown in FIG. 6 may be executed by a network device. It can be understood that interaction between the network device and a terminal device described from the perspective of a network device side is similar to the description from the perspective of a terminal device side in the method shown in FIG. 4. To avoid repetition, related description is properly omitted. As shown in FIG. 6, the method includes the following steps.

S610: Transmit a spatial transmission information set, where the spatial transmission information set includes a QCL information set and a spatial relation information set, the QCL information set is used by a terminal device to determine QCL information of a downlink channel or downlink reference signal in at least one cell, and the spatial relation information set is used by the terminal device to determine spatial relation information of an uplink channel or uplink reference signal in the at least one cell.

Optionally, as an example, the QCL information set is a common QCL information set for all cells in the at least one cell, and the spatial relation information set is a common spatial relation information set for all the cells in the at least one cell; or the QCL information set is configured by a network device for a first target cell in the at least one cell, and the spatial relation information set is configured by the network device for a second target cell in the at least one cell.

Optionally, as an example, in a case in which the at least one cell includes a plurality of cells, the plurality of cells are located in a same frequency band.

Optionally, as an example, a cell index of the first target cell satisfies a first preset rule; and/or a cell index of the second target cell satisfies a second preset rule.

FIG. 7 is a radio communication method according to an embodiment of this disclosure. The method shown in FIG. 7 may be executed by a network device. It can be understood that interaction between the network device and a terminal device described from the perspective of a network device side is similar to the description from the perspective of a terminal device side in the method shown in FIG. 5. To avoid repetition, related description is properly omitted. As shown in FIG. 7, the method includes the following steps.

S710: Transmit a spatial transmission information set, where the spatial transmission information set includes a QCL information set or a spatial relation information set, and the spatial transmission information set is used by a terminal device to determine QCL information of a downlink channel or downlink reference signal in at least one cell and spatial relation information of an uplink channel or uplink reference signal in the at least one cell.

Optionally, as an example, the spatial transmission information set is a common spatial transmission information set of all cells in the at least one cell, or the spatial transmission information set is configured by the network device for a target cell in the at least one cell.

Optionally, as an example, in a case in which the at least one cell includes a plurality of cells, the plurality of cells are located in a same frequency band.

The radio communication methods in some embodiments of this disclosure are described in detail above with reference to FIG. 1 to FIG. 7, and the device in some embodiments of this disclosure is described in detail below with reference to FIG. 8.

FIG. 8 is a schematic structural diagram of a device according to an embodiment of this disclosure. As shown in FIG. 8, the device includes:

a first processing module 81, configured to: in a case in which a first target CORESET is configured for a first cell in a target frequency band, determine first target QCL information of the first target CORESET configured for the first cell; and a second processing module 82, configured to: determine, based on the first target QCL information, QCL information of a downlink channel or downlink reference signal in at least one cell or spatial relation information of an uplink channel or uplink reference signal in the at least one cell.

Optionally, as an example, the second processing module 82 is specifically configured to:

determine QCL information of a downlink channel or downlink reference signal on part or all of BWPs of each of the at least one cell; and determine spatial relation information of an uplink channel or uplink reference signal on part or all of BWPs of each of the at least one cell.

Optionally, as an example, the at least one cell includes the first cell, and the second processing module 82 is specifically configured to:

determine that QCL information of a downlink channel or downlink reference signal in the first cell is the first target QCL information.

Optionally, as an example, the at least one cell includes the first cell, and the second processing module 82 is specifically configured to:

determine that a QCL information set of a downlink channel or downlink reference signal in the first cell is a first QCL information set to which the first target QCL information belongs; and determine QCL information of the downlink channel or downlink reference signal in the first cell from the QCL information set of the downlink channel or downlink reference signal in the first cell.

Optionally, as an example, the at least one cell includes the first cell, a plurality of CORESETs are configured for the first cell, and the plurality of CORESETs include the first target CORESET.

The second processing module 42 is specifically configured to:

based on indication by a media access control control unit MAC CE, determine, from a first QCL information set to which the first target QCL information belongs, QCL information of a CORESET other than the first target CORESET in the plurality of CORESETs.

Optionally, as an example, the at least one cell includes the first cell and a second cell, and the first target CORESET is not configured for the second cell.

The second processing module 82 is specifically configured to:

determine QCL information of a downlink channel or downlink reference signal in the second cell based on the first target QCL information.

Optionally, as an example, the second processing module 82 is specifically configured to:

determine that the QCL information of the downlink channel or downlink reference signal in the second cell is the first target QCL information.

Optionally, as an example, the second processing module 82 is specifically configured to:

determine the QCL information of the downlink channel or downlink reference signal in the second cell based on the first QCL information set to which the first target QCL information belongs.

Optionally, as an example, the second processing module 82 is specifically configured to:

determine that a QCL information set of a downlink channel or downlink reference signal in the second cell is a first QCL information set to which the first target QCL information belongs; and determine the QCL information of the downlink channel or downlink reference signal in the second cell from the QCL information set of the downlink channel or downlink reference signal in the second cell.

Optionally, as an example, a cell index of the first cell satisfies a first preset rule.

Optionally, as an example, the second cell is located in the target frequency band.

Optionally, as an example, in a case in which the first target CORESET is configured for none of cells in a frequency band in which each of the at least one cell is located, the second processing module 82 is further configured to:

determine a second QCL information set configured for a third cell; and determine the QCL information of the downlink channel or downlink reference signal in the at least one cell based on the second QCL information set.

Optionally, as an example, the at least one cell is located in the target frequency band, and the third cell is located in the target frequency band.

Optionally, as an example, the second processing module 82 is specifically configured to:

determine, from the second QCL information set, second target QCL information of a second target CORESET configured for the third cell; and determine that the QCL information of the downlink channel or downlink reference signal in the at least one cell is the second target QCL information.

Optionally, as an example, the second processing module 82 is specifically configured to:

determine that a QCL information set of the downlink channel or downlink reference signal in the at least one cell is the second QCL information set; and determine the QCL information of the downlink channel or downlink reference signal in the at least one cell from the QCL information set of the downlink channel or downlink reference signal in the at least one cell.

Optionally, as an example, a cell index of the third cell satisfies a second preset rule; and/or an ID of the second target CORESET satisfies a third preset rule; and/or an ID of a BWP on which the second target CORESET is located satisfies a fourth preset rule.

Optionally, as an example, the at least one cell includes the first cell, and the second processing module 82 is specifically configured to:

determine a reference signal RS set corresponding to a first transmission configuration indication TCI state, where the first TCI state is used for indicating the first target QCL information; and determine spatial relation information of an uplink channel or uplink reference signal in the first cell based on a source RS in the RS set.

Optionally, as an example, the at least one cell includes the first cell, and the second processing module 82 is specifically configured to:

determine spatial relation information of an uplink channel or uplink reference signal in the first cell based on a first QCL information set to which the first target QCL information belongs.

Optionally, as an example, the second processing module 82 is specifically configured to:

determine a second TCI state used for indicating all QCL information in the first QCL information set;

determine candidate spatial relation information of the uplink channel or uplink reference signal in the first cell based on all source RSs in an RS set corresponding to the second TCI state; and determine the spatial relation information of the uplink channel or uplink reference signal in the first cell from the candidate spatial relation information.

Optionally, as an example, the second processing module 82 is specifically configured to:

based on indication by radio resource control RRC signaling and/or a MAC CE, determine the spatial relation information of the uplink channel or uplink reference signal in the first cell from the candidate spatial relation information.

Optionally, as an example, a maximum quantity of pieces of configurable spatial relation information in a cell is greater than or equal to a quantity of pieces of QCL information in the first QCL information set.

The second processing module 82 is specifically configured to:

determine a second TCI state used for indicating all QCL information in the first QCL information set;

determine candidate spatial relation information of the uplink channel or uplink reference signal in the first cell based on all source RSs in an RS set corresponding to the second TCI state; and determine the spatial relation information of the uplink channel or uplink reference signal in the first cell from the candidate spatial relation information.

Optionally, as an example, the second processing module 82 is specifically configured to:

determine a preset quantity of pieces of QCL information from the first QCL information set; and determine the spatial relation information of the uplink channel or uplink reference signal in the first cell based on a source RS in an RS set corresponding to a third TCI state, where the third TCI state is used for indicating the preset quantity of pieces of QCL information.

Optionally, as an example, the at least one cell includes the first cell and a fourth cell, and the first target CORESET is not configured for the fourth cell.

The second processing module 82 is specifically configured to:

determine spatial relation information of an uplink channel or uplink reference signal in the fourth cell based on the first target QCL information.

Optionally, as an example, the second processing module 82 is specifically configured to:

determine the first TCI state used for indicating the first target QCL information; and determine the spatial relation information of the uplink channel or uplink reference signal in the fourth cell based on a source RS in the RS set corresponding to the first TCI state.

Optionally, as an example, the second processing module 82 is specifically configured to:

determine the spatial relation information of the uplink channel or uplink reference signal in the fourth cell based on the first QCL information set to which the first target QCL information belongs.

Optionally, as an example, the fourth cell is located in the target frequency band.

Optionally, as an example, in a case in which the first target CORESET is configured for none of cells in a frequency band in which each of the at least one cell is located, the second processing module 82 is further configured to:

determine a third QCL information set configured for a fifth cell; and determine the spatial relation information of the uplink channel or uplink reference signal in the at least one cell based on the third QCL information set.

Optionally, as an example, the at least one cell is located in the target frequency band, and the fifth cell is located in the target frequency band.

Optionally, as an example, the second processing module 82 is specifically configured to:

determine, from the third QCL information set, third target QCL information of a third target CORESET configured for the fifth cell; and determine the spatial relation information of the uplink channel or uplink reference signal in the at least one cell based on the third target QCL information.

Optionally, as an example, a cell index of the fifth cell satisfies a fifth preset rule; and/or an ID of the third target CORESET satisfies a sixth preset rule; and/or an ID of a BWP on which the third target CORESET is located satisfies a seventh preset rule.

Optionally, as an example, the at least one cell includes the first cell and a sixth cell, and a QCL information set is not configured for the sixth cell. The second processing module 82 is further configured to:

determine that a QCL information set of the sixth cell is a first QCL information set to which the first target QCL information belongs; and determine, based on the QCL information set of the sixth cell, QCL information of a downlink channel or downlink reference signal in the sixth cell and spatial relation information of an uplink channel or uplink reference signal in the sixth cell.

Optionally, as an example, the sixth cell is located in the target frequency band.

Optionally, as an example, the at least one cell includes the first cell and a seventh cell, and a QCL information set is not configured for the seventh cell. The second processing module 82 is further configured to:

determine that QCL information of a downlink channel or downlink reference signal in the seventh cell is the QCL information of the downlink channel or downlink reference signal in the first cell; and/or determine spatial relation information of an uplink channel or uplink reference signal in the seventh cell based on the QCL information of the downlink channel or downlink reference signal in the first cell.

Optionally, as an example, the seventh cell is located in the target frequency band.

Optionally, as an example, the at least one cell includes the first cell and an eighth cell, and a QCL information set is not configured for the eighth cell. The second processing module 82 is further configured to:

determine that spatial relation information of an uplink channel or uplink reference signal in the eighth cell is the spatial relation information of the uplink channel or uplink reference signal in the first cell.

Optionally, as an example, the eighth cell is located in the target frequency band.

Optionally, as an example, the first processing module 81 is specifically configured to:

determine, based on the indication by the MAC CE, the first target QCL information from the first QCL information set to which the first target QCL information belongs, where the first QCL information set is configured by a network device by using RRC signaling.

Optionally, as an example, an ID of the first target CORESET is 0.

The device provided in some embodiments of this disclosure is capable of implementing processes that are implemented by the device in the method embodiments of FIG. 1 to FIG. 3. To avoid repetition, details are not described herein again.

FIG. 9 is a schematic structural diagram of a terminal device according to an embodiment of this disclosure. As shown in FIG. 9, the terminal device includes:

a transceiver module 91, configured to receive a spatial transmission information set, where the spatial transmission information set includes a QCL information set and a spatial relation information set; and a processing module 92, configured to determine QCL information of a downlink channel or downlink reference signal in at least one cell based on the QCL information set.

The processing module 92 is further configured to determine spatial relation information of an uplink channel or uplink reference signal in the at least one cell based on the spatial relation information set.

Optionally, as an example, the QCL information set is a common QCL information set for all cells in the at least one cell, and the spatial relation information set is a common spatial relation information set for all the cells in the at least one cell; or the QCL information set is configured by a network device for a first target cell in the at least one cell, and the spatial relation information set is configured by the network device for a second target cell in the at least one cell.

Optionally, as an example, in a case in which the at least one cell includes a plurality of cells, the plurality of cells are located in a same frequency band.

Optionally, as an example, the processing module 92 is specifically configured to:

determine QCL information of a downlink channel or downlink reference signal on part or all of BWPs of each of the at least one cell; and determine spatial relation information of an uplink channel or uplink reference signal on part or all of BWPs of each of the at least one cell.

Optionally, as an example, a cell index of the first target cell satisfies a first preset rule; and/or a cell index of the second target cell satisfies a second preset rule.

The terminal device provided in some embodiments of this disclosure is capable of implementing processes that are implemented by the device in the method embodiment of FIG. 4. To avoid repetition, details are not described herein again.

Figure 10:
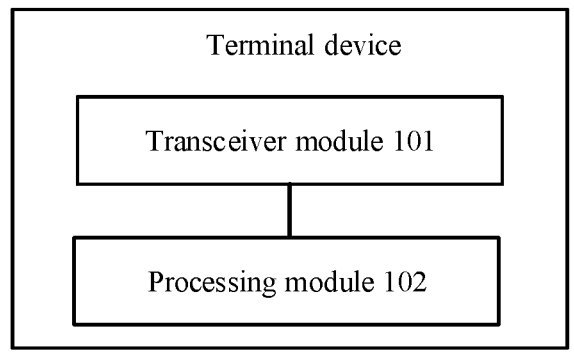
FIG. 10 is another schematic structural diagram of a terminal device according to an embodiment of this disclosure.

FIG. 10 is a schematic structural diagram of a terminal device according to an embodiment of this disclosure. As shown in FIG. 10, the terminal device includes:

a transceiver module 101, configured to receive a spatial transmission information set, where the spatial transmission information set includes a QCL information set or a spatial relation information set; and a processing module 102, configured to determine, based on the spatial transmission information set, QCL information of a downlink channel or downlink reference signal in at least one cell and spatial relation information of an uplink channel or uplink reference signal in the at least one cell.

Optionally, as an example, the spatial transmission information set is a common spatial transmission information set of all cells in the at least one cell, or the spatial transmission information set is configured by a network device for a target cell in the at least one cell.

Optionally, as an example, the processing module 102 is specifically configured to:

determine QCL information of a downlink channel or downlink reference signal on part or all of BWPs of each of the at least one cell; and determine spatial relation information of an uplink channel or uplink reference signal on part or all of BWPs of each of the at least one cell.

Optionally, as an example, in a case in which the at least one cell includes a plurality of cells, the plurality of cells are located in a same frequency band.

The terminal device provided in some embodiments of this disclosure is capable of implementing processes that are implemented by the device in the method embodiment of FIG. 5. To avoid repetition, details are not described herein again.

Figure 11:
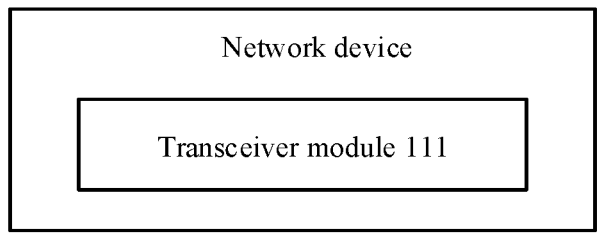
FIG. 11 is a schematic structural diagram of a network device according to an embodiment of this disclosure.

FIG. 11 is a schematic structural diagram of a network device according to an embodiment of this disclosure. As shown in FIG. 11, the network device includes:

a transceiver module 111, configured to transmit a spatial transmission information set, where the spatial transmission information set includes a QCL information set and a spatial relation information set, the QCL information set is used by a terminal device to determine QCL information of a downlink channel or downlink reference signal in at least one cell, and the spatial relation information set is used by the terminal device to determine spatial relation information of an uplink channel or uplink reference signal in the at least one cell.

Optionally, as an example, the QCL information set is a common QCL information set for all cells in the at least one cell, and the spatial relation information set is a common spatial relation information set for all the cells in the at least one cell; or the QCL information set is configured by a network device for a first target cell in the at least one cell, and the spatial relation information set is configured by the network device for a second target cell in the at least one cell.

Optionally, as an example, in a case in which the at least one cell includes a plurality of cells, the plurality of cells are located in a same frequency band.

Optionally, as an example, a cell index of the first target cell satisfies a first preset rule; and/or a cell index of the second target cell satisfies a second preset rule.

The network device provided in some embodiments of this disclosure is capable of implementing processes that are implemented by the network device in the method embodiment of FIG. 7. To avoid repetition, details are not described herein again.

Figure 12:
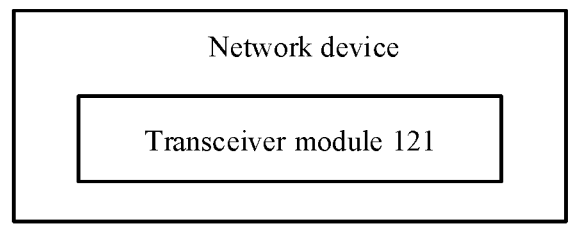
FIG. 12 is another schematic structural diagram of a network device according to an embodiment of this disclosure.

FIG. 12 is a schematic structural diagram of a network device according to an embodiment of this disclosure. As shown in FIG. 12, the network device includes:

a transceiver module 121, configured to transmit a spatial transmission information set, where the spatial transmission information set includes a QCL information set or a spatial relation information set, and the spatial transmission information set is used by a terminal device to determine QCL information of a downlink channel or downlink reference signal in at least one cell and spatial relation information of an uplink channel or uplink reference signal in the at least one cell.

Optionally, as an example, the spatial transmission information set is a common spatial transmission information set of all cells in the at least one cell, or the spatial transmission information set is configured by the network device for a target cell in the at least one cell.

Optionally, as an example, in a case in which the at least one cell includes a plurality of cells, the plurality of cells are located in a same frequency band.

The network device provided in some embodiments of this disclosure is capable of implementing processes that are implemented by the network device in the method embodiment of FIG. 8. To avoid repetition, details are not described herein again.

Figure 13:
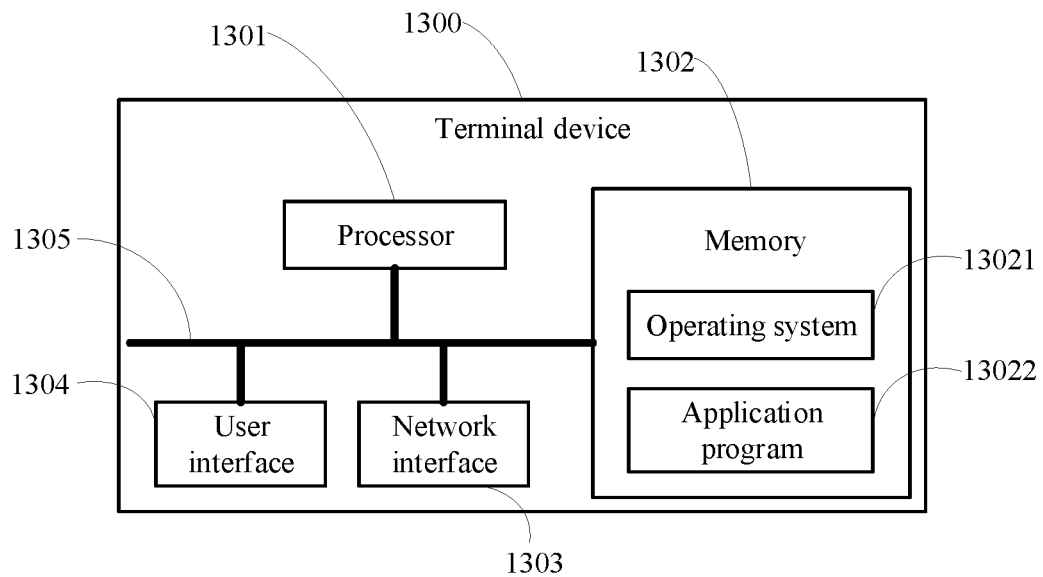
FIG. 13 is still another schematic structural diagram of a terminal device according to an embodiment of this disclosure.

FIG. 13 is a block diagram of a terminal device according to an embodiment of this disclosure. The terminal device 1300 shown in FIG. 13 includes at least one processor 1301, a memory 1302, a user interface 1303, and at least one network interface 1304. The components of the terminal device 1300 are coupled together by using a bus system 1305. It can be understood that the bus system 1305 is configured to implement connection communication between these components. The bus system 1305 may include not only a data bus but also a power supply bus, a control bus, and a status signal bus. However, for clear description, various buses in FIG. 13 are marked as the bus system 1305.

The user interface 1303 may include a display, a keyboard, a click device (for example, a mouse or a trackball (trackball)), a touch board, or a touchscreen.

It can be understood that the memory 1302 in some embodiments of this disclosure may be a volatile memory or a non-volatile memory, or may include both a volatile memory and a non-volatile memory. The non-volatile memory may be a read-only memory (ROM), a programmable read only memory (Programmable ROM, PROM), an erasable programmable read-only memory (Erasable PROM, EPROM), and an electrically erasable programmable read-only memory (Electrically EPROM, EEPROM), or flash memory. The volatile memory may be a random access memory (RAM), which is used as an external cache. As illustrative rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DRRAM). The memory 1302 in the system and method described in some embodiments of this disclosure is intended to include but is not limited to these and any other appropriate types of memories.

In some implementations, the memory 1302 stores the following elements: an executable module or a data structure, or a subset thereof, or an extended set thereof: an operating system 13021 and an application program 13022.

An operating system 13021 includes various system programs, such as a framework layer, a kernel library layer, and a driver layer, and is configured to implement various basic services and process hardware-based tasks. The application program 13022 includes various application programs, such as a media player (Media Player), and a browser (Browser), and is configured to implement various application services. A program that implements the methods of some embodiments of this disclosure may be included in the application program 13022.

In some embodiments of this disclosure, the terminal device 1300 further includes: a computer program stored in the memory 1302 and capable of running on the processor 1301. When the computer program is executed by the processor 1301, the processes of the methods described in FIG. 1 to FIG. 7 are implemented, with the same technical effects achieved. To avoid repetition, details are not described herein again.

The foregoing methods disclosed by some embodiments of this disclosure may be applied to the processor 1301, or be implemented by the processor 1301. The processor 1301 may be an integrated circuit chip with a signal processing capability. In an implementation process, steps in the foregoing method may be implemented by using a hardware integrated logic circuit in the processor 1301, or by using instructions in a form of software. The processor 1301 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in some embodiments of this disclosure. The general-purpose processor may be a microprocessor, or the processor may also be any conventional processor or the like. Steps of the methods disclosed with reference to some embodiments of this disclosure may be directly performed and completed by using a hardware decoding processor, or may be performed and completed by using a combination of hardware and a software module in a decoding processor. The software module may be located in a computer readable storage medium that is mature in the art, such as a random access memory, a flash memory, a read-only memory, a programmable read-only memory, or an electrically erasable programmable memory, or a register. The computer readable storage medium is located in the memory 1302, and the processor 1301 reads information in the memory 1302 and implements, in combination with its hardware, the steps of the foregoing methods. Specifically, a computer program is stored in the computer-readable storage medium, and when the computer program is executed by the processor 1301, the steps of the method embodiments described in FIG. 1 to FIG. 7 are implemented.

It can be understood that the embodiments described in some embodiments of this disclosure may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in some embodiments of this disclosure may be implemented by modules (such as processes and functions) that perform the functions described in some embodiments of this disclosure. Software code may be stored in the memory and executed by the processor. The memory may be implemented in or outside the processor.

Figure 14:
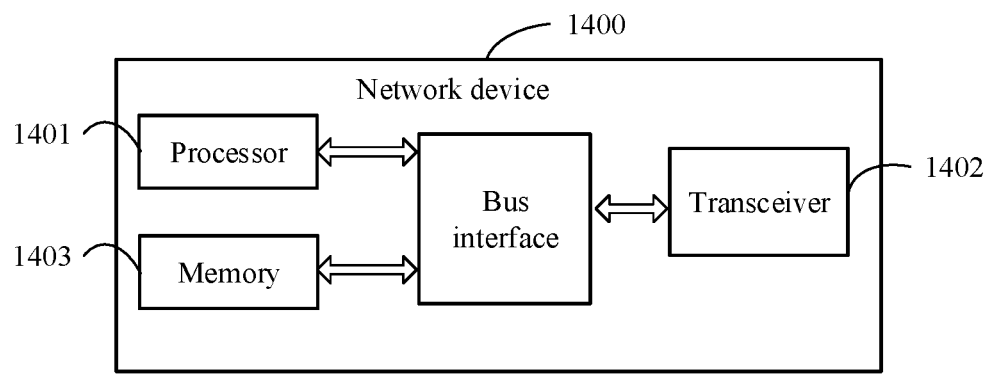
FIG. 14 is still another schematic structural diagram of a network device according to an embodiment of this disclosure.

FIG. 14 is a schematic structural diagram of a network device according to some embodiment of this disclosure. As shown in FIG. 14, the network device 1400 includes a processor 1401, a transceiver 1402, a memory 1403, and a bus interface.

In some embodiments of this disclosure, the network device 1400 further includes: a computer program stored in the memory 1403 and capable of running on the processor 1401. When the computer program is executed by the processor 1401, the processes executed by the network device in the methods described in FIG. 1 to FIG. 7 are implemented, with the same technical effects achieved. To avoid repetition, details are not described herein again.

In FIG. 14, a bus architecture may include any quantity of interconnected buses and bridges, specifically for interconnecting various circuits of one or more processors represented by the processor 1401 and a memory represented by the memory 1403. The bus architecture may further interconnect various other circuits such as a peripheral device, a voltage regulator, and a power management circuit. These are all well known in the art, and therefore are not further described in this specification. The bus interface provides an interface. The transceiver 1402 may be a plurality of components, that is, the transceiver 1402 includes a transmitter and a receiver, and provides units for communicating with various other apparatuses on a transmission medium.

The processor 1401 is responsible for management of the bus architecture and general processing, and the memory 1403 is capable of storing data that is used by the processor 1401 during operation.

Some embodiments of this disclosure further provide a computer-readable storage medium. The computer-readable storage medium stores a computer program, and when the computer program is executed by a processor, the processes of the method embodiments shown in FIG. 1 to FIG. 7 are implemented, with the same technical effects achieved. To avoid repetition, details are not described herein again. The computer-readable storage medium is, for example, a read-only memory (ROM for short), a random access memory (RAM for short), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer readable storage medium. When the program runs, the processes of the method embodiments may be included. The storage medium may include: a magnetic disk, an optical disc, a read-only memory (ROM), or a random access memory (RAM).

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A radio communication method, comprising:
 determining, by a communication device when a first target control resource set (CORESET) is configured for a first cell in a target frequency band, first target quasi co-location (QCL) information of the first target CORESET configured for the first cell; and determining, by the communication device based on the first target QCL information, QCL information of a downlink channel or downlink reference signal in at least one cell; and determining, by the communication device based on the first target QCL information, spatial relation information of an uplink channel or uplink reference signal in the at least one cell.

2. The method according to claim 1, wherein the determining QCL information of a downlink channel or downlink reference signal in at least one cell comprises:

determining QCL information of a downlink channel or downlink reference signal on part or all of bandwidth parts (BWPs) of each of the at least one cell; and the determining spatial relation information of an uplink channel or uplink reference signal in the at least one cell comprises:

determining spatial relation information of an uplink channel or uplink reference signal on part or all of BWPs of each of the at least one cell.

3. The method according to claim 1, wherein the at least one cell comprises the first cell; and the determining, based on the first target QCL information, QCL information of a downlink channel or downlink reference signal in the at least one cell comprises: determining that QCL information of a downlink channel or downlink reference signal in the first cell is the first target QCL information;

and/or, wherein the at least one cell comprises the first cell; and the determining, based on the first target QCL information, QCL information of a downlink channel or downlink reference signal in the at least one cell comprises: determining that a QCL information set of a downlink channel or downlink reference signal in the first cell is a first QCL information set to which the first target QCL information belongs; and determining QCL information of the downlink channel or downlink reference signal in the first cell from the QCL information set of the downlink channel or downlink reference signal in the first cell;

and/or, wherein the at least one cell comprises the first cell, a plurality of CORESETs are configured for the first cell, and the plurality of CORESETs comprise the first target CORESET;

and the determining, based on the first target QCL information, QCL information of a downlink channel or downlink reference signal in the at least one cell comprises: based on indication by a media access control control element (MAC CE), determining, from a first QCL information set to which the first target QCL information belongs, QCL information of a CORESET other than the first target CORESET in the plurality of CORESETs.

4. The method according to claim 3, wherein the at least one cell comprises the first cell and a seventh cell, and a QCL information set is not configured for the seventh cell; and the method further comprises at least one of:

determining that QCL information of a downlink channel or downlink reference signal in the seventh cell is the QCL information of the downlink channel or downlink reference signal in the first cell; or determining spatial relation information of an uplink channel or uplink reference signal in the seventh cell based on the QCL information of the downlink channel or downlink reference signal in the first cell.

5. The method according to claim 1, wherein the at least one cell comprises the first cell and a second cell, and the first target CORESET is not configured for the second cell; and the determining, based on the first target QCL information, QCL information of a downlink channel or downlink reference signal in the at least one cell comprises:

determining QCL information of a downlink channel or downlink reference signal in the second cell based on the first target QCL information.

6. The method according to claim 5, wherein the determining QCL information of a downlink channel or downlink reference signal in the second cell based on the first target QCL information comprises at least one of:

determining that the QCL information of the downlink channel or downlink reference signal in the second cell is the first target QCL information;

or, determining the QCL information of the downlink channel or downlink reference signal in the second cell based on the first QCL information set to which the first target QCL information belongs.

7. The method according to claim 1, wherein in a case in which the first target CORESET is configured for none of cells in a frequency band in which each of the at least one cell is located, the method further comprises:

determining a second QCL information set configured for a third cell; and determining the QCL information of the downlink channel or downlink reference signal in the at least one cell based on the second QCL information set.

8. The method according to claim 7, wherein the determining the QCL information of the downlink channel or downlink reference signal in the at least one cell based on the second QCL information set comprises at least one of:

determining, from the second QCL information set, second target QCL information of a second target CORESET configured for the third cell; and determining that the QCL information of the downlink channel or downlink reference signal in the at least one cell is the second target QCL information;

or, determining that a QCL information set of the downlink channel or downlink reference signal in the at least one cell is the second QCL information set; and determining the QCL information of the downlink channel or downlink reference signal in the at least one cell from the QCL information set of the downlink channel or downlink reference signal in the at least one cell.

9. The method according to claim 1, wherein the at least one cell comprises the first cell; and the determining, based on the first target QCL information, spatial relation information of an uplink channel or uplink reference signal in the at least one cell comprises at least one of:

determining a reference signal RS set corresponding to a first transmission configuration indication TCI state, wherein the first TCI state is used for indicating the first target QCL information; and determining spatial relation information of an uplink channel or uplink reference signal in the first cell based on a source RS in the RS set;

or, determining spatial relation information of an uplink channel or uplink reference signal in the first cell based on a first QCL information set to which the first target QCL information belongs.

10. The method according to claim 9, wherein the determining spatial relation information of an uplink channel or uplink reference signal in the first cell based on a first QCL information set to which the first target QCL information belongs comprises: determining a second TCI state used for indicating all QCL information in the first QCL information set; determining candidate spatial relation information of the uplink channel or uplink reference signal in the first cell based on all source RSs in an RS set corresponding to the second TCI state; and determining the spatial relation information of the uplink channel or uplink reference signal in the first cell from the candidate spatial relation information;

and/or wherein a maximum quantity of pieces of configurable spatial relation information in a cell is greater than or equal to a quantity of pieces of QCL information in the first QCL information set; and the determining spatial relation information of an uplink channel or uplink reference signal in the first cell based on a first QCL information set to which the first target QCL information belongs comprises: determining a second TCI state used for indicating all QCL information in the first QCL information set; determining candidate spatial relation information of the uplink channel or uplink reference signal in the first cell based on all source RSs in an RS set corresponding to the second TCI state; and determining the spatial relation information of the uplink channel or uplink reference signal in the first cell from the candidate spatial relation information;

and/or, wherein the determining spatial relation information of an uplink channel or uplink reference signal in the first cell based on a first QCL information set to which the first target QCL information belongs comprises: determining a preset quantity of pieces of QCL information from the first QCL information set; and determining the spatial relation information of the uplink channel or uplink reference signal in the first cell based on a source RS in an RS set corresponding to a third TCI state, wherein the third TCI state is used for indicating the preset quantity of pieces of QCL information.

11. The method according to claim 9, wherein the at least one cell comprises the first cell and a fourth cell, and the first target CORESET is not configured for the fourth cell; and the determining, based on the first target QCL information, spatial relation information of an uplink channel or uplink reference signal in the at least one cell further comprises:

determining spatial relation information of an uplink channel or uplink reference signal in the fourth cell based on the first target QCL information.

12. The method according to claim 11, wherein the determining spatial relation information of an uplink channel or uplink reference signal in the fourth cell based on the first target QCL information comprises at least one of:

determining the first TCI state used for indicating the first target QCL information; and determining the spatial relation information of the uplink channel or uplink reference signal in the fourth cell based on a source RS in the RS set corresponding to the first TCI state;

or, determining the spatial relation information of the uplink channel or uplink reference signal in the fourth cell based on the first QCL information set to which the first target QCL information belongs.

13. The method according to claim 9, wherein in a case in which the first target CORESET is configured for none of cells in a frequency band in which each of the at least one cell is located, the method further comprises:

determining a third QCL information set configured in a fifth cell; and determining the spatial relation information of the uplink channel or uplink reference signal in the at least one cell based on the third QCL information set.

14. The method according to claim 9, wherein the at least one cell comprises the first cell and an eighth cell, and a QCL information set is not configured for the eighth cell; and the method further comprises:

determining that spatial relation information of an uplink channel or uplink reference signal in the eighth cell is the spatial relation information of the uplink channel or uplink reference signal in the first cell.

15. The method according to claim 1, wherein the at least one cell comprises the first cell and a sixth cell, and a QCL information set is not configured for the sixth cell; and the method further comprises:

determining that a QCL information set of the sixth cell is a first QCL information set to which the first target QCL information belongs; and determining, based on the QCL information set of the sixth cell, QCL information of a downlink channel or downlink reference signal in the sixth cell, and spatial relation information of an uplink channel or uplink reference signal in the sixth cell.

16. The method according to claim 1, wherein the determining first target QCL information of the first target CORESET configured for the first cell comprises:

determining, based on the indication by the MAC CE, the first target QCL information from the first QCL information set to which the first target QCL information belongs, wherein the first QCL information set is configured by a network device by using RRC signaling.

17. The method according to claim 1, wherein an ID of the first target CORESET is 0.

18. A device, comprising a memory, a processor, and a computer program stored in the memory and capable of running on the processor, wherein when the computer program is executed by the processor, the processor is configured to implement:

determining, when a first target control resource set (CORESET) is configured for a first cell in a target frequency band, first target quasi co-location (QCL) information of the first target CORESET configured for the first cell; and determining, based on the first target QCL information, QCL information of a downlink channel or downlink reference signal in at least one cell; and determining, based on the first target QCL information, spatial relation information of an uplink channel or uplink reference signal in the at least one cell.

19. The device according to claim 18, wherein the processor is further configured to implement:

determining QCL information of a downlink channel or downlink reference signal on part or all of bandwidth parts (BWPs) of each of the at least one cell; and the processor is further configured to implement:

determining spatial relation information of an uplink channel or uplink reference signal on part or all of BWPs of each of the at least one cell.

20. The device according to claim 18, wherein an ID of the first target CORESET is 0.

\* \* \* \* \*